Oct. 22, 1929.   R. JAEGER   1,732,442
POSITIVE FEED PRESSURE ELIMINATOR FOR SAWDUST BURNERS
Filed Feb. 29, 1928   2 Sheets-Sheet 2
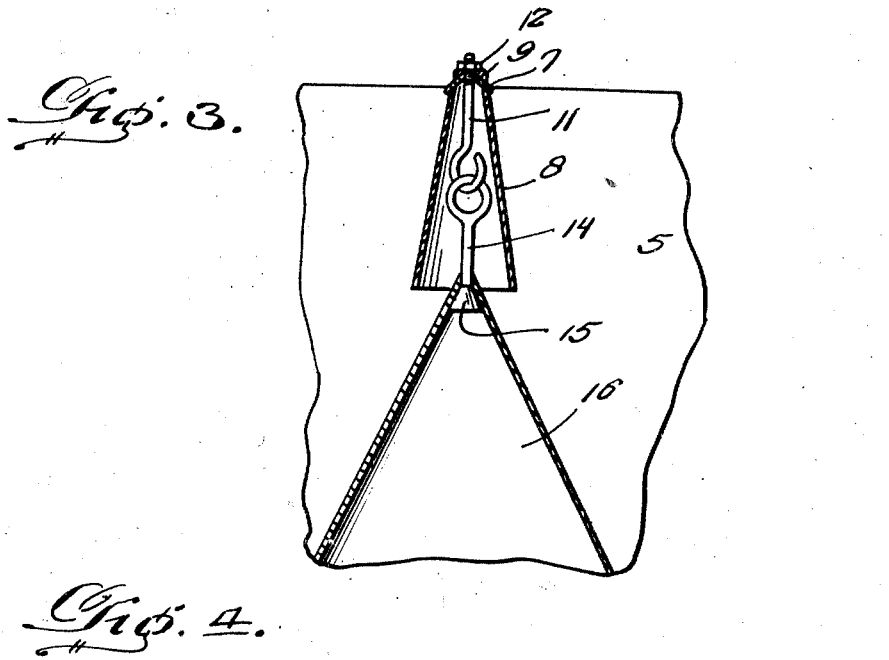
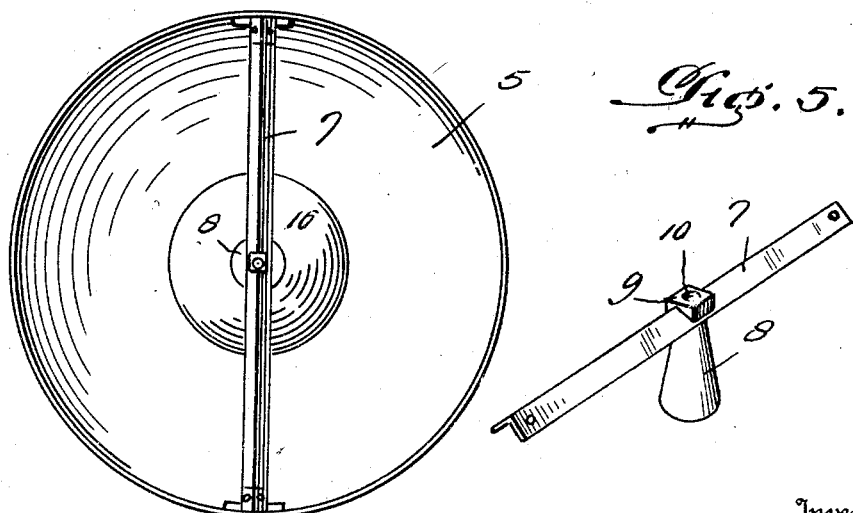
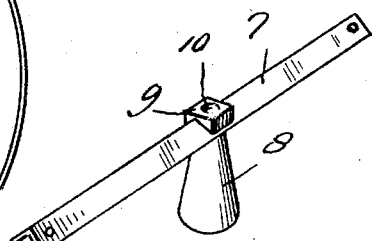
Inventor
Ralph Jaeger,
By Clarence A. O'Brien
Attorney Patented Oct. 22, 1929

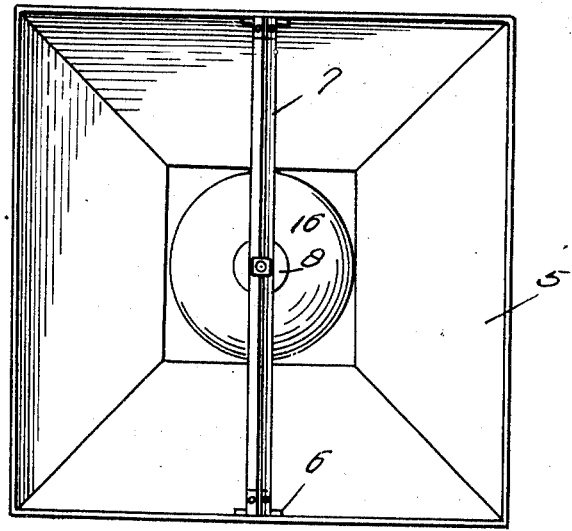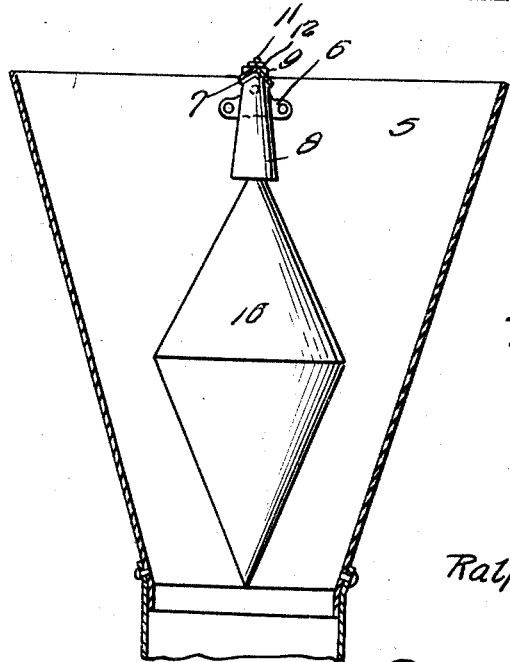

1,732,442

UNITED STATES PATENT OFFICE

RALPH JAEGER, OF TACOMA, WASHINGTON

POSITIVE-FEED PRESSURE ELIMINATOR FOR SAWDUST BURNERS

Application filed February 29, 1928. Serial No. 258,085.

The present invention relates to a positive feed pressure eliminator for saw dust burners which are in common use in certain sections of the country. As is well known the saw dust burner consists of sliding grates or plates set against the front door of an ordinary house furnace or a furnace used in heating larger buildings, and above this metal box which contains the plate or grate is a hopper usually made of galvanized sheet iron. This hopper is conical shaped or rectangular, being larger at the top than at the bottom so that the saw dust will gradually flow by gravity down to the plates where it burns. The greater the draft on the plates, the faster the sawdust flows down and burns. Various grades of saw dust are used. If the sawdust happens to be fine, it will frequently pack and stick in the hopper and not flow down readily. A great deal of difficulty is experienced in preventing the packing and clogging of the sawdust in the hopper which prevents it freely flowing to the fire. The present invention has for its prime object to prevent this clogging and permit an even flow of the sawdust.

A further important object of the invention is to provide a mechanism of this nature, which is exceedingly simple in its construction, inexpensive to manufacture and install, thoroughly efficient and reliable in operation, not likely to easily become out of order, requiring no attention, and otherwise well adapted to the purpose for which it is designed.

With the above and numerous other objects in view, as will appear as the description proceeds, the invention resides in certain novel features of construction, and in the combination and arrangement of parts as will be hereinafter described and claimed.

In the drawing:

Figure 1 is a top plan view of a saw dust hopper with my improved mechanism mounted therein.

Figure 2 is a vertical section therethrough.

Figure 3 is an enlarged detail section taken vertically through the mechanism, and Figure 4 is a top plan view in another embodiment of hopper.

Figure 5 is a perspective view of the supporting member.

Referring to the drawing in detail, it will be seen that in Figure 1, I have illustrated a hopper rectangular in horizontal cross section, tapering downwardly, while in Figure 4 I have shown a section, circular in cross section and tapering downwardly, being substantially of an inverted frusto-conical formation. For the purpose of clearness, both forms of the conventional hopper have been shown but any other form of hopper may be utilized, with equal efficiency with the apparatus about to be described and forming the essence of my invention. I shall refer to the hopper generally by the numeral 5 hereinafter. In the present example of the apparatus, I mount suitable brackets or equivalent means 6 on the walls of the hopper 5, interiorly thereof, at the upper end thereof for supporting a cross bar 7, preferably of channel iron, to be V-shaped in cross section. A frusto-conical shield 8, depends from the center of the cross bar 7, and, if desired, may be separable therefrom or molded integrally therewith. A bearing block 9 may be used on the bar 5 and has an opening 10 registering with a similar opening in the bar and with the interior of the shield 8. A hook bolt or the equivalent 11 is disposed in the shield 8, extending through said openings 10 and has a nut 12 threaded on the upper end thereof, which, of course, will rest against the block 9. An eye bolt 14 has its eye engaged with the hook of the hook bolt 11, and terminates in a head 15 at the bottom end thereof. A double cone like member 16 comprises an upper cone shaped portion and a lower inverted cone-shaped portion. Through the upper apex of the member 16, the eye bolt 14 extends, and the head is larger than the opening in the apex so that this member 16 is suspended from the cross bar 7 in the hopper, so that the lower apex thereof terminates approximately at the lower end of the hopper. This member 16 is free to swing as a pendulum on the hook bolt 11, as will be apparent. The head and bolt 14 allow the member 16 to revolve, if necessary. The cone will move freely about, in the hopper. As the sawdust flows from one side of the hopper, the pressure is relieved on that side of the member 16 and said member will then swing to that side, to permit the sawdust from the other side to flow freely. In a series of tests among sawdust users, this device has proven that it will efficiently and effectively eliminate packed sawdust, when finer grades of fuel are used. It has even been found that very coarsely ground wood fuel, known as hogged fuel can be successfully used in the ordinary household saw dust burner by the use of this apparatus.

It is thought that the construction, operation and advantages of this invention will now be quite apparent to those skilled in this art, without a more detailed description thereof. The present embodiment of the invention has been disclosed in detail, merely by way of example, since in actual practice it attains the features of advantage enumerated as desirable in the statement of the invention and the above description. It will be apparent that changes in the details of construction, in the material, in the sizes and proportions, and in the combination and arrangement of parts may be resorted to, without departing from the spirit or scope of the invention as hereinafter claimed or sacrificing any of its advantages.

Having thus described my invention, what I claim as new is:

1. In a positive feed pressure eliminator for sawdust burners, a sawdust hopper, a cross bar across the top of the hopper, a pendulum like member, means for swingably and swivelly mounting the member from the cross bar, and an inverted cup-shaped shield over said means.

2. In a positive feed pressure eliminator for sawdust burners, a sawdust hopper, a cross bar across the top of the hopper, a pendulum like member, means for swingably and swivelly mounting the member from the cross bar, an inverted cup-shaped shield over said means, said means being in the form of a hook engaged with the cross bar and an eye bolt engaged with the hook and swivelly engaged with the pendulum like member.

In testimony whereof I affix my signature.

RALPH JAEGER.